United States Patent [19]
Hurst et al.

[11] Patent Number: 5,382,792
[45] Date of Patent: Jan. 17, 1995

[54] ANGLE SENSOR WITH HERMETIC SEALING AND MAGNETIC COUPLING

[75] Inventors: Kurt Hurst, Stuttgart; Klaus Brill, Korntal-Muenchingen; Hans Braun, Stuttgart, all of Germany

[73] Assignee: Robert Bosch GmbH, Stuttgart, Germany

[21] Appl. No.: 30,401

[22] PCT Filed: Sep. 10, 1991

[86] PCT No.: PCT/DE91/00721
§ 371 Date: Mar. 24, 1993
§ 102(e) Date: Mar. 24, 1993

[30] Foreign Application Priority Data

Sep. 25, 1990 [DE] Germany ............ 4030229

[51] Int. Cl.⁶ ............................ G01D 5/34
[52] U.S. Cl. ................ 250/231.13; 250/231.14
[58] Field of Search ........ 250/231.13, 231.14, 250/231.16, 231.18, 237 G, 227.21; 356/395

[56] References Cited

U.S. PATENT DOCUMENTS

| | | | |
|---|---|---|---|
| 4,767,164 | 8/1988 | Yeung | 250/227.21 |
| 4,796,966 | 1/1989 | Kovaleski et al. | 250/227.21 |
| 4,947,035 | 8/1990 | Zook et al. | 250/227.21 |
| 5,047,629 | 9/1991 | Geist | 250/231.13 |

FOREIGN PATENT DOCUMENTS

| | | |
|---|---|---|
| 0090576A3 | 10/1985 | European Pat. Off. |
| 0184232 | 6/1986 | European Pat. Off. |
| 3527067A1 | 1/1987 | Germany |
| 526806 | 9/1976 | U.S.S.R. |

Primary Examiner—David C. Nelms
Attorney, Agent, or Firm—Spencer, Frank & Schneider

[57] ABSTRACT

An angle sensor is proposed, preferably a no-contact angle sensor, particularly for use in motor vehicles, with the angle sensor including a component (10) that is carried along by the arrangement whose angular displacement is to be monitored, and a measuring device (12) for determining the rotational displacement angle (13, Ψ). The measuring device (12, 14, 16) is hermetically encapsulated and includes a magnetic coupling (22, 24) between the carried-along component (10) and the measuring device (12, 14, 16).

15 Claims, 3 Drawing Sheets

ANGLE SENSOR WITH HERMETIC SEALING AND MAGNETIC COUPLING

STATE OF THE ART

The invention is based on an angle sensor of the no contact type, preferably for motor vehicles, which includes a first component which is attached to or carried along by the rotatable arrangement or device to be monitored, and a second component or measuring device which cooperates with the first component to determine the rotational displacement angle. Such angle sensors are known in principle, with the measuring of the angle being effected optically, inductively or capacitively. Also known in machine construction are magnetic couplings, for example for use in pumps employed in process technology.

SUMMARY AND ADVANTAGES OF THE INVENTION

An angle sensor according to the invention, which is a no-contact angle sensor, particularly for motor vehicles, includes a component that is carried along by the arrangement whose angular displacement is to be monitored and an optical measuring device for determining the displacement angle ($\Psi$), with the measuring device including a coding disc which is rotatably mounted within a hermetically sealed housing and is magnetically coupled with the component carried along by the arrangement to be monitored. The magnetic coupling includes at least one pair of magnets, with one magnet of each pair being on the coding disc and the other magnet of each pair being on the component carried along by the arrangement to be monitored.

The angle sensor according to the invention has the advantage that hermetic encapsulation becomes possible; this provides protection against the high stresses and interferences to which such sensors may be subjected, particularly in operation in a motor vehicle. Their operational reliability is consequently increased significantly, without adversely influencing the accuracy of the sensor, since, if dimensioned correctly, practically no measuring errors occur from the magnetic circuit. The structural measures to be discussed and illustrated below permit optimization of the dynamic behavior.

The measures defined in the dependent claims provide for advantageous modifications and improvements of the basic angle sensor. Particularly advantageous in this connection is the versatility of the structural configuration while simultaneously providing for a gas-tight encapsulation of the measuring device which is susceptible to interference.

BRIEF DESCRIPTION OF THE DRAWING

Two embodiments of the invention are illustrated in the drawing and will be described in greater detail below.

DETAILED DESCRIPTION OF THE PREFERRED EMBODIMENTS

Figure 1:
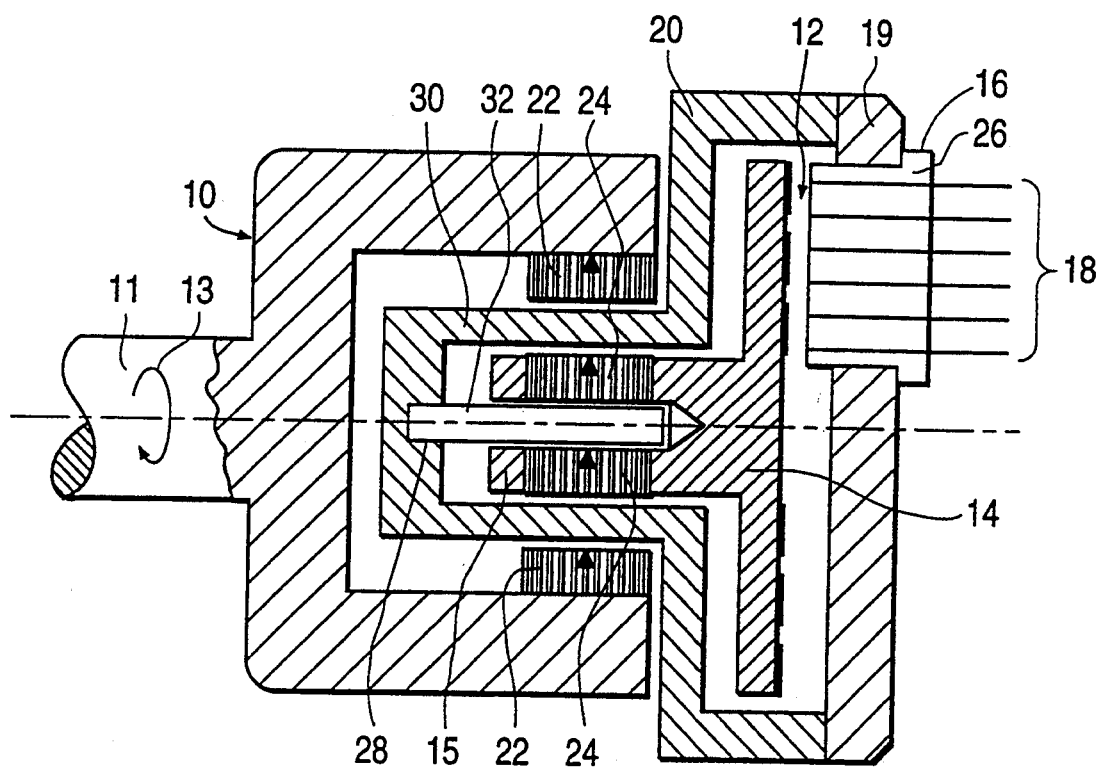
FIG. 1 is a sectional view of an angle sensor according to the invention.

FIG. 1 is a sectional view of a no-contact angle sensor operating according to the optical measuring principle, particularly for use in motor vehicles. This angle sensor includes a component 10 that is carried along by a non-illustrated, rotationally movable arrangement to be monitored which is connected to shaft 11 and a measuring device 12. Component 10 thus is driven to rotate by way of a shaft 11. The measuring device, which as a whole is marked 12, detects the rotational displacement angle 13 of the arrangement to be monitored.

Measuring device 12 includes a coding disc 14 as well as an optical scanner 16 in which a bundle 18 of optical conductors is held hermetically sealed adjacent to coding disc 14. A holder 26 is seated in a gas-tight manner in a metal cover plate 19 which is soldered in a gas-tight manner to a likewise metal housing 20. Cover plate 19 and housing 20 are preferably made of brass.

Magnets 22 that are driven by the arrangement to be monitored are fastened to the carried-along component 10 and are opposed by magnets 24 which are carried along in the interior of the gas-tight housing 20. Magnets 24 are seated on an extension 15 of coding disc 14 which is held coaxially with shaft 11 in a bearing 28 that is essentially composed of a bore in a housing extension 30 and a pin 32 in extension 15.

If no-contact angle sensors are employed in a motor vehicle there exists the danger of soiling, for example by dust or the condensation of oil vapors or moisture. Protecting the angle sensors against these environmental influences is very difficult since the slightest amounts of soiling or precipitation may considerably falsify the measuring result. The use of a magnetic coupling between the driven component 10 and the measuring component 12 of the sensor makes it possible to hermetically encapsulate at least the components that are sensitive to interference. The arrangement according to the invention is particularly suitable, but not exclusively, for no-contact angle sensors since, in connection with the latter, soiling and precipitations causes considerable falsifications of the measuring results, for example in connection with optical or capacitive scanning. The magnetic coupling ensures interference-free operation of the sensor over long periods of operation under the rough operating conditions existing in a motor vehicle.

In principle, two magnet arrangements are possible. In the radial arrangement shown in FIG. 2, the magnetic flux runs as shown by dashed line 17. This embodiment has the advantage that the carried along coupling member 10 is subjected to no forces in the axial direction which would require additional measures and great precision in manufacturing in order to avoid errors. In contrast thereto, the axial configuration shown in FIG. 3 has the advantage that it permits a very flat, compact structure for the angle sensor. The magnetic coupling between the carried-along member 10 and coding disc 14 as the measured value pickup ensures an operationally reliable and long-lasting configuration of the angle sensor with excellent measuring accuracy. Moreover, the dynamic behavior of the entire system can advantageously be adapted to operating conditions in a motor vehicle.

Figure 2:
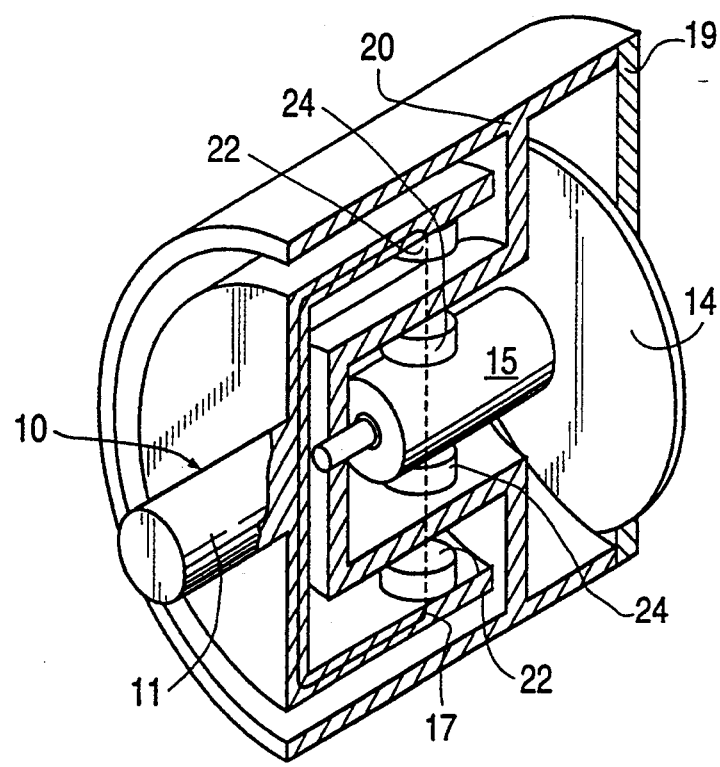
FIG. 2 depicts a first embodiment equipped with radially oriented magnets.
Figure 3:
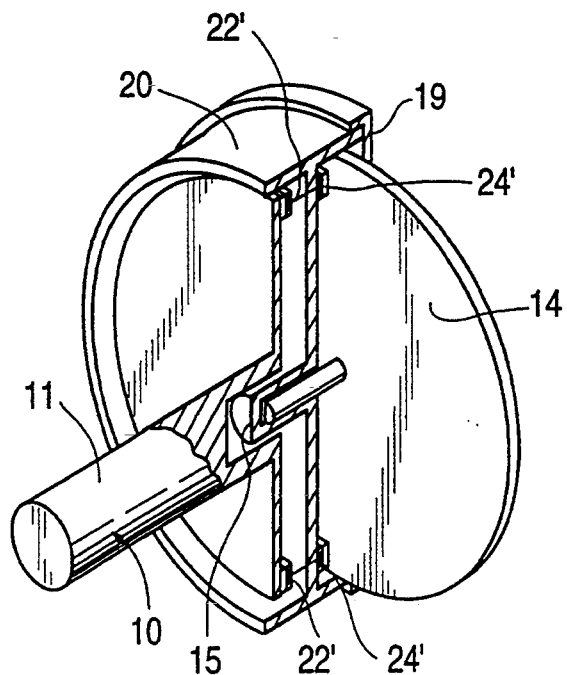
FIG. 3 shows a second embodiment equipped with axially oriented magnets.

The arrangements shown in FIGS. 1 to 3 include a coding disc 14 onto which a pattern has been applied in a digital code. This code is scanned by way of a bundle 18 of optical conductors. Coding disc 14 forms a unit with the carried-along component 10 of the angle sensor, with the driving side of the coupling including magnets 22 and 22', respectively, being fixed to the arrangement to be monitored, for example, the throttle valve in the motor vehicle whose angular position is to be detected. A fiber holder 26 is gas-tightly installed in cover plate 19 which in turn is soldered to housing 20 and thus seals the interior of the angle sensor and coding disc 14 gas-tightly against the atmosphere.

The magnet arrangement is selected so that there is an unequivocal association between the carried-along component and the driving component; that is, if the magnets are arranged radially according to FIG. 2, only one pair of magnetic poles is disposed in a section plane. If the magnets are arranged axially according to FIG. 3, only one pair of poles is disposed on each radius. The magnetic restoring moment is selected by the dimensions and the arrangement of magnets 22, 24; 22', 24' so that, except for physically unavoidable, very small regions in the vicinity of the two equilibrium positions, the restoring moment is always greater than the moment generated by the friction forces and a return into the zero position reliably occurs after each deflection.

Figure 4:
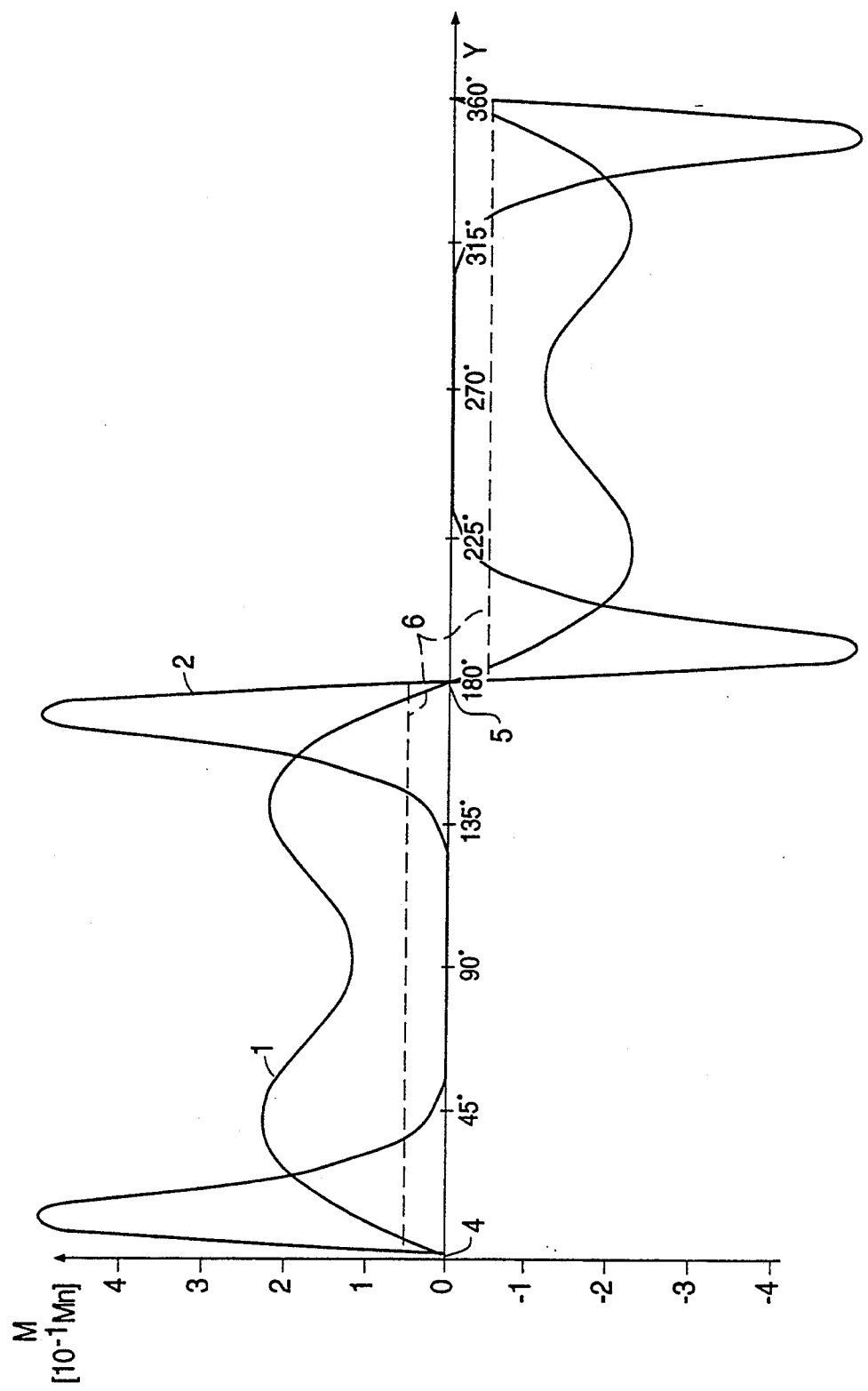
FIG. 4 is a curve of the restoring moment of the magnetic coupling as a function of the rotational displacement angle between the two coupling components.

FIG. 4 shows the curve of the restoring moment M as a function of the rotational displacement angle $\Psi$ between the two coupling members for two different configurations. For the sake of clarity, the restoring moment 6 required to overcome the strong friction is exaggerated compared to real conditions. In a design of the magnetic coupling according to curve 1, which is applicable for broadened, lower-quality magnets and an enlarged air gap, a return to the zero position is always ensured. If the magnetic coupling is designed according to curve 2, which is applicable for narrow magnets made of a high-quality magnetic material and a small air gap width, friction forces between about 30° and 150° and between 210° and 330° would prevent the arrangement from being turned back into the zero position.

In the arrangement according to the invention, the bearing and air friction can be kept so low that the dynamic error occurring at a constant angular velocity due to delayed follow-up and friction generated static hysteresis errors remain within the vicinity of the permissible measuring error (e.g. <1%). The electrical resistance of the material of the partition between magnets 22 and 24 and 22' and 24', respectively, is set by way of the selection of a suitable material and the appropriate calculation of the wall thickness so that optimum damping values are produced by eddy currents. In this way, there will never be any improper overshooting due to great changes in velocity.

We claim:

1. A no-contact angle sensor for monitoring the rotational displacement angle of a rotatably mounted device, said sensor comprising: a first component mounted for rotation together with the device to be monitored; an optical measuring device for determining the rotational displacement angle of said first component and including a second component which carries a coding disc having markings related to angular displacement, which is mounted within a hermetically sealed housing for rotation coaxially with said first component, and which has a portion which extends radially adjacent said first component; and a magnetic coupling arrangement between said first component and said portion of said second component of said measuring device, with said magnetic coupling arrangement including at least one pair of magnets with one magnet of each said pair of magnets being provided on said first component and a further magnet of each said pair of magnets being provided on said portion of said second component of said measuring device opposite said one magnet such that said measuring device is actuated by the magnetic field of said one magnet moving with the device to be monitored of each said pair of magnets.

2. An angle sensor according to claim 1 wherein said at least one pair of magnets of said magnetic coupling arrangement comprises at least one pair of radially oriented magnets.

3. An angle sensor according to claim 2, wherein only one pair of poles is present in a section plane of the magnetic coupling arrangement.

4. An angle sensor according to claim 1 wherein said at least one pair of magnets of said magnetic coupling arrangement comprises at least one pair of axially oriented magnets.

5. An angle sensor according to claim 4, wherein only one pair of poles is disposed on each radius of the magnetic coupling arrangement.

6. An angle sensor according to claim 1 wherein said housing is a non-magnetic, metal housing.

7. An angle sensor according to claim 1 wherein said measuring device further includes a holder for a bundle of optical conductors inserted in a gas-tight manner in a wall of said housing.

8. In a motor vehicle, an angle sensor as defined in claim 1 mounted to monitor the angular displacement of a vehicle part.

9. An angle sensor according to claim 7 wherein said holder for the bundle of optical conductors of said measuring device is soldered into a non-magnetic, metal cover plate of said housing.

10. An angle sensor according to claim 1 wherein the restoring moment of the magnetic coupling arrangement is essentially greater over the entire rotational displacement range of said measuring device than the moment generated by friction forces in the measuring device.

11. An angle sensor according to claim 1 wherein the rotational movement of said second component of said measuring device is damped by suitably dimensioning and configuring said metal housing in the region between said at least one pair of magnets, and by the dimensions and configuration of said magnets.

12. An angle sensor as defined in claim 1 wherein said housing is made of a non-magnetic material and said first component and at least said portion of said second component are made of ferromagnetic material.

13. An angle sensor as defined in claim 12 wherein said non-magnetic material of which said housing is made is brass.

14. An angle sensor as defined in claim 9 wherein said housing is made of brass.

15. An angle sensor as defined in claim 1 wherein at least two of said pair of magnets are provided.

* * * * *